(12) United States Patent
Kato

(10) Patent No.: US 6,736,755 B2
(45) Date of Patent: May 18, 2004

(54) CONTROLLER FOR AUTOMATIC TRANSMISSIONS

(75) Inventor: Yoshiaki Kato, Kanagawa (JP)

(73) Assignee: Jatco LTD, Fuji (JP)

( * ) Notice: Subject to any disclaimer, the term of this patent is extended or adjusted under 35 U.S.C. 154(b) by 180 days.

(21) Appl. No.: 10/130,309
(22) PCT Filed: Mar. 1, 2002
(86) PCT No.: PCT/JP02/01893
§ 371 (c)(1), (2), (4) Date: May 16, 2002
(87) PCT Pub. No.: WO02/070924
PCT Pub. Date: Sep. 12, 2002

(65) Prior Publication Data
US 2003/0144111 A1 Jul. 31, 2003

(30) Foreign Application Priority Data
Mar. 2, 2001 (JP) ........................... 2001-057978

(51) Int. Cl.⁷ .............................................. B60K 41/20
(52) U.S. Cl. .......................................... 477/92; 477/117
(58) Field of Search ..................................... 477/92, 117

(56) References Cited

U.S. PATENT DOCUMENTS 4,748,870 A * 6/1988 Sugino et al. .............. 477/117
4,930,080 A * 5/1990 Suzuki ........................ 701/66
5,704,873 A * 1/1998 Iwata et al. ................. 477/115
5,741,201 A * 4/1998 Tsutsui et al. .............. 477/116

FOREIGN PATENT DOCUMENTS

| JP | 6-174079 | 6/1994 |
| JP | 2000-46166 | 2/2000 |
| JP | 2000-234537 | 8/2000 |
| JP | 2001-41066 | 2/2001 |
| JP | 2001-263467 | 9/2001 |
| JP | 2001-330124 | 11/2001 |

* cited by examiner

*Primary Examiner*—Dirk Wright
(74) *Attorney, Agent, or Firm*—Foley & Lardner LLP

(57) ABSTRACT

There are arranged an engine 10 having idle-stop control means and an automatic transmission 20 having as a hydraulic-pressure supply source a main pump 22 driven by the engine 10 to perform speed change control. There are arranged a bypass hydraulic passage 45 for ensuring communication between said main pump 22 and a point immediately before an engagement-pressure supply port of a forward engagement element L/C in the automatic transmission, a switching valve 44 on the bypass hydraulic passage 45 for allowing switching between the communicating state and the non-communicating state, and switching-valve control means for switching the switching valve 44 between the communicating state and the non-communicating state. With this, the main pump is stopped at idle-stop control to supply the hydraulic pressure required for restart, allowing smooth running.

15 Claims, 13 Drawing Sheets

FIG.3

| RANGE | | R/C | H/C | L/C | D/C | L&R/B | 2-4/B | RD/B | L-OWC | RD-OWC |
|---|---|---|---|---|---|---|---|---|---|---|
| P | | | | | | | | ○ | | |
| R | | ○ | | | | ○ | | ○ | | |
| N | | | | | | | | ○ | | |
| D | 1st SPEED | | | ○ | | △ | | ○ | ○ | ○ |
|   | 2nd SPEED | | | ○ | | | ○ | ○ | | ○ |
|   | 3rd SPEED | | ○ | ○ | | | | ○ | | ○ |
|   | 4th SPEED | | ○ | | | | ○ | ○ | | ○ |
|   | 5th SPEED | | ○ | | ○ | | ○ | | | |

CONTROLLER FOR AUTOMATIC TRANSMISSIONS

TECHNICAL FIELD

The present invention relates to a control system for an automatic transmission, and more particularly, to a control system for a vehicle, which is provided with an idle stop controller for stopping engine idle at a standstill of the running vehicle.

BACKGROUND ART

In recent years, idle stop vehicles are already operational wherein when the running vehicle comes into a standstill, and predetermined stop conditions are formed, an engine is automatically stopped to achieve fuel savings, a reduction in exhaust emission or noises and the like. With such vehicle, when the engine is stopped, a main pump driven by the engine is stopped, so that oil supplied to a forward clutch of an automatic transmission is also drawn from a hydraulic passage, lowering the hydraulic pressure.

As a result, when the engine is restarted, the forward clutch to be engaged at forward running also releases from its engagement state. Thus, if the forward clutch is not engaged quickly at engine restart, an accelerator pedal is depressed in the neutral state as it were, which may produce an engagement shock by engagement of the forward clutch with the engine at full throttle.

Therefore, the technique described, for example, in JP-A 2000-46166 is known as means for solving this.

This technique uses two pumps wherein the main pump is operated to supply fluid, and the assist pump driven by an electric motor is operated solely at stop of the main pump such as at engine stop to compensate for flow shortage, allowing secured supply of working fluid to the automatic transmission while keeping power consumption of a battery at the minimum.

However, in the above-mentioned prior art, the assist pump driven by the electric motor is always driven at engine stop, leading to significant power consumption. Particularly, at traffic congestion or the like, there arose a problem that a great load is applied not only to the battery, but also to the motor itself for driving the assist pump.

Moreover, since the assist pump is driven by the electric motor, the pump and the electric motor should be mounted on the automatic transmission, raising a problem of deteriorating the vehicle mountability.

DISCLOSURE OF THE INVENTION

The present invention aims to provide a control system for an automatic transmission having as a hydraulic-pressure supply source a main pump driven by an engine, wherein at idle stop control, the main pump is stopped to supply the hydraulic pressure required for running at restart, allowing smooth running.

The present invention is made in view of the problem in the prior art as mentioned above. The invention as described in claim 1 provides a control system for an automatic transmission in a vehicle comprising: an engine including a starter motor for start and idle-stop control means for outputting signals for idle operation and stop for the engine to an engine control unit in accordance with preset idle stop conditions and on the basis of a vehicle speed signal sensed by a vehicle speed sensor, a steering angle signal sensed by a steering angle sensor, a signal out of brake operation detecting means for detecting brake operation and the like; and an automatic transmission for performing speed change control using as a hydraulic-pressure supply source a main pump driven by said engine, characterized by arranging a bypass hydraulic passage for ensuring communication between said main pump and a point immediately before an engagement-pressure supply port of a forward engagement element in the automatic transmission, a switching valve on said bypass hydraulic passage to allow switching between a communication state and a non-communication state, and switching-valve control means for switching said switching valve between the communication state and the non-communication state.

The control system for an automatic transmission as described in claim 1 includes no electric assist pump and the like in the prior art, so that when engine idle is stopped by idle-stop control means, the electric assist pump is not continuously operated during idle stop as well.

Therefore, idle stop control can be performed without applying a load to the battery and the electric motor and at low cost.

Moreover, the bypass hydraulic passage is arranged to ensure communication between the main pump with a point immediately before the engagement element, and the switching valve is arranged on the bypass hydraulic passage to switch between the communicating state and the non-communicating state. Therefore, by directly supplying oil to the hydraulic passages having oil discharged therefrom without waiting switching of the hydraulic passages by the shift valves, sufficient engagement pressure can quickly be supplied to the engagement element.

Further, the invention as described in claim 2 provides a control system for an automatic transmission in a vehicle comprising: an engine including a starter motor for start and idle-stop control means for outputting signals for idle operation and stop for the engine to an engine control unit in accordance with preset idle stop conditions and on the basis of a vehicle speed signal sensed by a vehicle speed sensor, a steering angle signal sensed by a steering angle sensor, a signal out of brake operation detecting means for detecting brake operation and the like; and an automatic transmission for performing speed change control using as a hydraulic-pressure supply source a main pump driven by said engine, characterized by arranging a bypass hydraulic passage for ensuring communication between said main pump and a point immediately before an engagement-pressure supply port of a forward engagement element in the automatic transmission, and switching-valve control means for switching said switching valve to the communication state during a predetermined time period when said idle-stop control means output a release command for releasing an idle stop of the engine after said idle stop.

In the control system for an automatic transmission as described in claim 2, the bypass hydraulic passage is arranged to ensure communication between the main pump with a point immediately before the engagement element, and the switching valve is arranged on the bypass hydraulic passage to switch between the communicating state and the non-communicating state.

And the switching-valve control means are arranged for switching the switching valve to the communication state during a predetermined time period at engine restart. Specifically, in the conventional hydraulic circuit for an automatic transmission, as shown, for example, in FIG. 10, the shift valves are arranged to perform switching of the hydraulic passages for supplying to the engagement elements the hydraulic pressure generated by the oil pump. The shift valves are actuated to switch the hydraulic passages, allowing engagement of the engagement elements and the like. At first speed start, for example, the pilot pressures are supplied to the shift valves A, B, C to supply the engagement pressures to the low clutch L/C and the reduction brake RD/B.

However, switching of the hydraulic passages by the shift valves requires a certain hydraulic pressure, which is produced after charging oil in the hydraulic passages having oil discharged therefrom once, requiring certain time for charging oil.

As a result, unless switching of the hydraulic passages is performed by the shift valves, the hydraulic pressure is supplied to the reduction brake RD/B, the 2-4 brake 2-4/B, and the high clutch H/C as shown, for example, by the hatched portions in FIG. 10, falling in fourth speed.

Then, in the invention of the present application, the bypass hydraulic passage is arranged in the engagement elements for first speed engagement so as to supply oil to the hydraulic passages having oil discharged therefrom without waiting switching of the hydraulic passages by the shift valves. By directly supplying oil to the points immediately before the engagement elements during a predetermined time period, sufficient engagement pressure can quickly be supplied to the engagement elements.

Moreover, since the switching-valve control means include means for switching the switching valve to the communication state during a predetermined time period when the idle-stop control means output a release command for releasing an idle stop of the engine after the idle stop, sufficient engagement pressure can quickly be supplied to the engagement elements at completion of idle stop control. Further, since the switching valve is put in the non-communication state aster a lapse of the predetermined time period, control can be made only with a timer and the like, resulting in simplification of control and reduction in cost.

Still further, the invention as described in claim 3 provides the control system for an automatic transmission as described in claim 1 or 2, wherein said switching-valve control means include means for driving said starter motor by an output of a release command for releasing an idle stop of the engine when the engagement pressure of said forward engagement element is greater than a predetermined value, or after the idle stop by said idle-stop control means, and for switching said switching valve to the non-communication state when outputting a signal for stopping driving of said starter motor after completion of engine start.

In the control system for an automatic transmission as described in claim 3, by stopping driving of the starter motor by engine restart (i.e. in the state where the main pump is driven with engine complete explosion to secure sufficient hydraulic pressure), the switching valve is switched to the non-communication state so as to allow supply of only the required hydraulic pressure to the forward engagement element. Thus, during normal running, smooth running can be achieved without having an influence on speed change control of the automatic transmission and the like.

Furthermore, the invention as described in claim 4 provides the control system for an automatic transmission as described in claim 1 or 2, wherein it comprises an orifice on a hydraulic passage for supplying a hydraulic pressure to each engagement element formed in the automatic transmission and said switching valve, wherein a diameter of the orifice of said switching valve is se to be more than twice as large as that of the orifice on the hydraulic passage of said each engagement element.

In the control system for an automatic transmission as described in claim 4, the diameter of the orifice of the switching valve is more than twice as large as that of the orifice of each engagement element. Specifically, as shown in FIG. 6, the normal hydraulic circuit for an automatic transmission is provided with orifices d1, d2, d3, d4 to prevent the surge pressure immediately after engagement of each engagement element. At this time, the oil amount is proportional to the square of the orifice diameter.

In the state where the pilot pressures are not sufficiently supplied to the shift valves 41, 42, 43, oil is supplied to the reduction brake RD/B, the 2-4 brake 2-4/B, and the high clutch H/C to supply the oil amount proportional to the diameters d2, d3, d4 (d2>d3>d4) of the orifices located on this hydraulic passage. Moreover, when oil is supplied to the low clutch L/C through the bypass hydraulic passage, the diameter of the orifice of the switching valve is set to be more than twice as large as the largest one d2 of the orifice diameters d2, d3, d4, wherein assuming that the flow rate of oil supplied to the low clutch L/C is Q, and the pump discharge amount is Q1, $$Q = 4d2^2 Q1 / (4d2^2 + d2^2 + d3^2 + d4^2) > 4d2^2 Q1 / (4d2^2 + d2^2 + d2^2 + d2^2)$$
$$= 4Q1/7 = 0.57\ Q1$$

It will be thus understood that about 60% of the discharge oil amount of the main pump can be supplied to the low clutch L/C. Therefore, sufficient oil amount can be supplied to the engagement elements required at engine restart, achieving smooth running.

In the invention as described in claim 4, the diameter of the orifice of the switching valve is set to be more than twice as large as the largest one d2. It is needless to say that the orifice diameter can be determined as appropriate by computing with the above-mentioned expression the orifice diameter which can secure the oil amount sufficient for the forward engagement elements in other hydraulic circuits, for example.

Further, the invention as described in claim 5 provides the control system for an automatic transmission as described in claim 1 or 2, wherein said idle-stop control means include means for prohibiting an idle stop when a select position selected by a driver is an R range or in a reverse state, and when a detected oil temperature fails to be within a predetermined range.

In the control system for an automatic transmission as described in claim 5, idle stop control is prohibited when the select position is at the R range.

Specifically, as shown in the engagement table in FIG. 3, at the first speed, the hydraulic pressure should be supplied to the low clutch L/C and the reduction brake RD/B. Even in the state where the shift valves do not switch the hydraulic passages, the hydraulic pressure is supplied to the reduction brake RD/B, and thus the hydraulic pressure needs to be supplied to the other part or the low clutch L/C only through the bypass hydraulic passage.

However, at the R range, the hydraulic pressure should also be supplied to the reverse clutch R/C and the low and reverse brake L&R/B, and thus it is difficult to supply the oil amount required for engagement before engine start. Then, at the R range, idle stop control is prohibited, allowing achievement of idle stop control without having complicated constitution and thus at low cost.

Moreover, idle stop control is prohibited when the oil temperature fails to be within a predetermined range. Specifically, if the oil temperature is too low, the viscosity resistance of oil becomes too high, resulting in impossible supply of sufficient oil amount before engine start. On the other hand, if the oil temperature is too high, the oil viscosity becomes too low, causing a decrease in volumetric efficiency of the main pump and an increase in leakage amount at the valve parts, resulting in impossible supply of sufficient oil amount in the same way.

Therefore, with idle stop control being prohibited when the oil temperature fails to be within a predetermined range, the engine is not stopped except when oil can surely be supplied at engine restart, allowing achievement of smooth idle stop control without having complicated constitution and thus at low cost.

Still further, the invention as described in claim 6 provides the control system for an automatic transmission as described in claims 1 to 3, wherein said forward engagement element is provided with engagement-pressure detecting means for detecting an engagement pressure and engagement-pressure comparing/determining means for comparing the detected engagement pressure and a predetermined engagement pressure set in advance for allowing securing of an engagement pressure, wherein said switching-valve control means include means for switching the switching valve to the non-communication state when said engagement-pressure comparing/determining means determine that the detected engagement pressure is greater than said predetermined engagement pressure.

In the control system for an automatic transmission as described in claim 6, the engagement-pressure detecting means are provided to detect an engagement pressure of the forward engagement element, and the engagement-pressure comparing/determining means compare the detected engagement pressure and a predetermined engagement pressure set in advance for allowing securing of an engagement pressure.

And if it is determined that the detected engagement pressure is greater than the predetermined engagement pressure, the switching-valve control means switch the switching valve to the non-communication state. Specifically, if the required engagement pressure is secured, it is not necessary to supply oil further from the bypass hydraulic passage.

Therefore, detection of the engagement pressure allows the bypass hydraulic passage to be put in the non-communication state with optimum timing, resulting in efficient use of the discharge oil amount of the main pump.

Furthermore, the invention as described in claim 7 provides the control system for an automatic transmission as described in claim 1 or 2, wherein said switching valve includes a solenoid valve comprising a return spring and an electromagnetic solenoid for generating an electromagnetic force opposite to the return spring, and said engagement-pressure detecting means and said engagement-pressure comparing/determining means include a feedback-pressure circuit for supplying from the downstream side of said solenoid valve a hydraulic-pressure force opposite to an electromagnetic force of said electromagnetic solenoid.

Therefore, in the control system for an automatic transmission as described in claim 7, the switching valve includes a solenoid valve comprising a return spring and an electromagnetic solenoid for generating an electromagnetic force opposite to the return spring, and the engagement-pressure detecting means and the engagement-pressure comparing/determining means include a feedback-pressure circuit for supplying from the downstream side of the solenoid valve a hydraulic-pressure force opposite to an electromagnetic force of the electromagnetic solenoid.

Thus, even if the switching-valve control means output a signal for maintaining the communication state of the bypass circuit during a predetermined time period, for example, if the hydraulic pressure supplied from the feedback-pressure circuit reaches a predetermined oil pressure, the bypass circuit can be put in the non-communication state without waiting a signal out of the switching-valve control means, achieving switching control of the switching valve with optimum timing.

Further, the invention as described in claim 8 provides a control system for an automatic transmission in a vehicle comprising: an engine including a starter motor for start and idle-stop control means for outputting signals for idle operation and stop for the engine to an engine control unit in accordance with preset idle stop conditions and on the basis of a vehicle speed signal sensed by a vehicle speed sensor, a steering angle signal sensed by a steering angle sensor, a signal out of brake operation detecting means for detecting brake operation and the like; an automatic transmission for performing speed change control using as a hydraulic-pressure supply source a main pump driven by said engine; a solenoid valve for directly supplying from said main pump an engagement pressure of a forward engagement element of said automatic transmission; and a solenoid-valve control means for current-value controlling operation of the solenoid valve, wherein said solenoid-valve control means include means for outputting a command for at least more than a predetermined pressure required for complete engagement of said forward engagement element with regard to a current value of said solenoid valve when said idle-stop control means output a release command for releasing an idle stop of the engine after the idle stop.

The control system for an automatic transmission as described in claim 8 is provided with a solenoid valve for directly supplying from the main pump an engagement pressure of a forward engagement element of the automatic transmission and a solenoid-valve control means for current-value controlling operation of the solenoid valve.

And the solenoid-valve control means include means for outputting a command for at least more than a predetermined pressure required for complete engagement of the forward engagement element with regard to a current value of the solenoid valve when the idle-stop control means output a release command for releasing an idle stop of the engine after the idle stop.

Thus, there is no electric assist pump and the like in the prior art, so that when engine idle is stopped by the idle-stop control means, the electric assist pump is not continuously operated during idle stop as well.

Therefore, idle stop control can be performed without applying a load to the battery and the electric motor and at low cost.

Moreover, in the invention as described in claims 1 to 7, there is arranged no solenoid valve for each engagement element, requiring arrangement of the bypass circuit. On the other hand, in the invention as described in claim 8, there is arranged a solenoid valve for directly supplying the hydraulic pressure to the forward engagement element, so that by directly supplying oil to the hydraulic passages having oil discharged therefrom without waiting switching of the hydraulic passages by the shift valves, sufficient engagement pressure can quickly be supplied to the engagement elements.

With this, the forward engagement elements are engaged quickly to depress the accelerator pedal in the neutral state, preventing a problem of producing an engagement shock by engagement of the forward clutch with the engine at full throttle.

Finally, the invention as described in claim 9 provides the control system for an automatic transmission as described in claim 8, characterized in that said solenoid-valve control means include means for continuing said command for more than the predetermined pressure until a vehicle speed after vehicle restart becomes a predetermined value after a given time subsequent to restart of the starter motor or after the idle stop.

Therefore, in the control system for an automatic transmission as described in claim 9, the solenoid-valve control means include means for continuing said command for more than the predetermined pressure until a vehicle speed after vehicle restart becomes a predetermined value after a given time subsequent to restart of the starter motor or after the idle stop.

Specifically, since the discharge amount of the main pump is sufficiently obtained after a given time elapses after vehicle restart, or when the vehicle speed becomes a predetermined speed, hydraulic-pressure control can be performed as usual. However, at the initial stage of restart, sufficient discharge amount of the main pump cannot be obtained. In such a state, a current value of the solenoid valve is set at a value higher than that at normal control to secure the discharge amount required for engagement, obtaining smooth engagement of the forward engagement elements, allowing achievement of smooth running.

BRIEF DESCRIPTION OF THE DRAWINGS

FIG. 3 is an engagement table of engagement elements of the step transmission in the embodiments;

BEST MODE FOR PRACTICING THE INVENTION

The embodiments of the present invention are described hereafter in accordance with the drawings.

Figure 1:
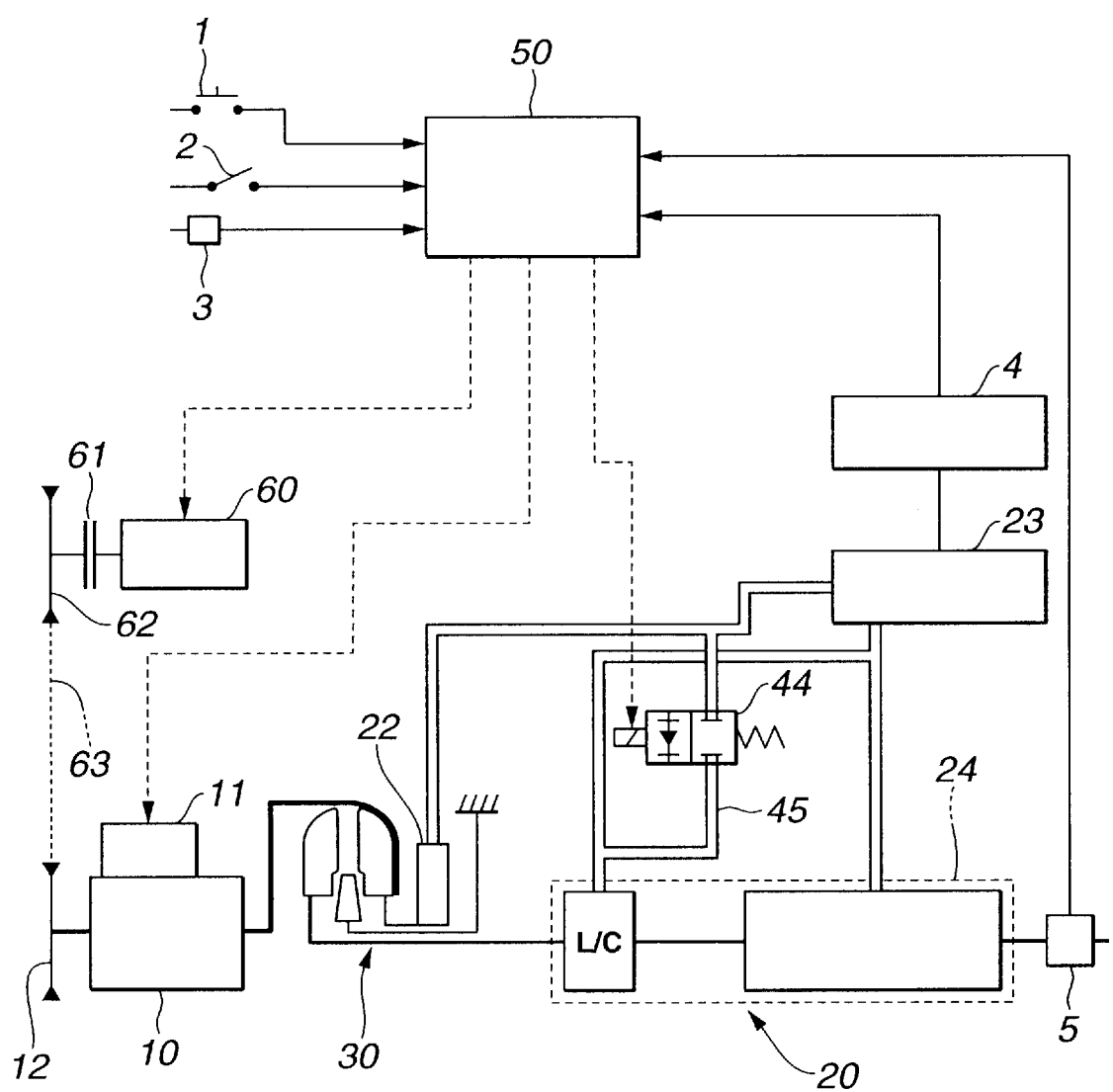
FIG. 1 is a drawing showing the constitution of a main unit of a vehicle provided with a control system for an automatic transmission in embodiments.

FIG. 1 is a drawing illustrating a control system for an automatic transmission in the embodiments.

10 an engine, 20 is an automatic transmission, 30 is a torque converter, 50 is a control unit, and 60 is a starter generator.

The engine 10 is provided with a fuel supply system 11 for supplying fuel to the engine 10. Moreover, a chain sprocket 12 is arranged, which is coupled to a chain sprocket 62 and chain 63 provided to the starter generator 60 through an electromagnetic clutch 61. When serving as a starter of the engine 10, a generator in deceleration, and a generator for generating power in accordance with the battery storage state, this starter generator 60 is put in engagement with the engine 10 by the electromagnetic clutch 61.

Moreover, the automatic transmission 20 is provided with a main pump 22 rotated and driven with the engine 10 and for supplying the hydraulic pressure to a hydraulic servo 23, which is branched off to directly communicate with a piston chamber of a forward clutch 21 through a hydraulic-passage switching solenoid valve 44.

The control unit 50 has signals input from an idle stop switch 1, a brake switch 2, a steering angle sensor 3, an oil temperature sensor 4, and a vehicle speed sensor 5 to control operation of the hydraulic-passage switching solenoid valve 44 and the fuel supply system 11.

[Embodiment 1]

Figure 2:
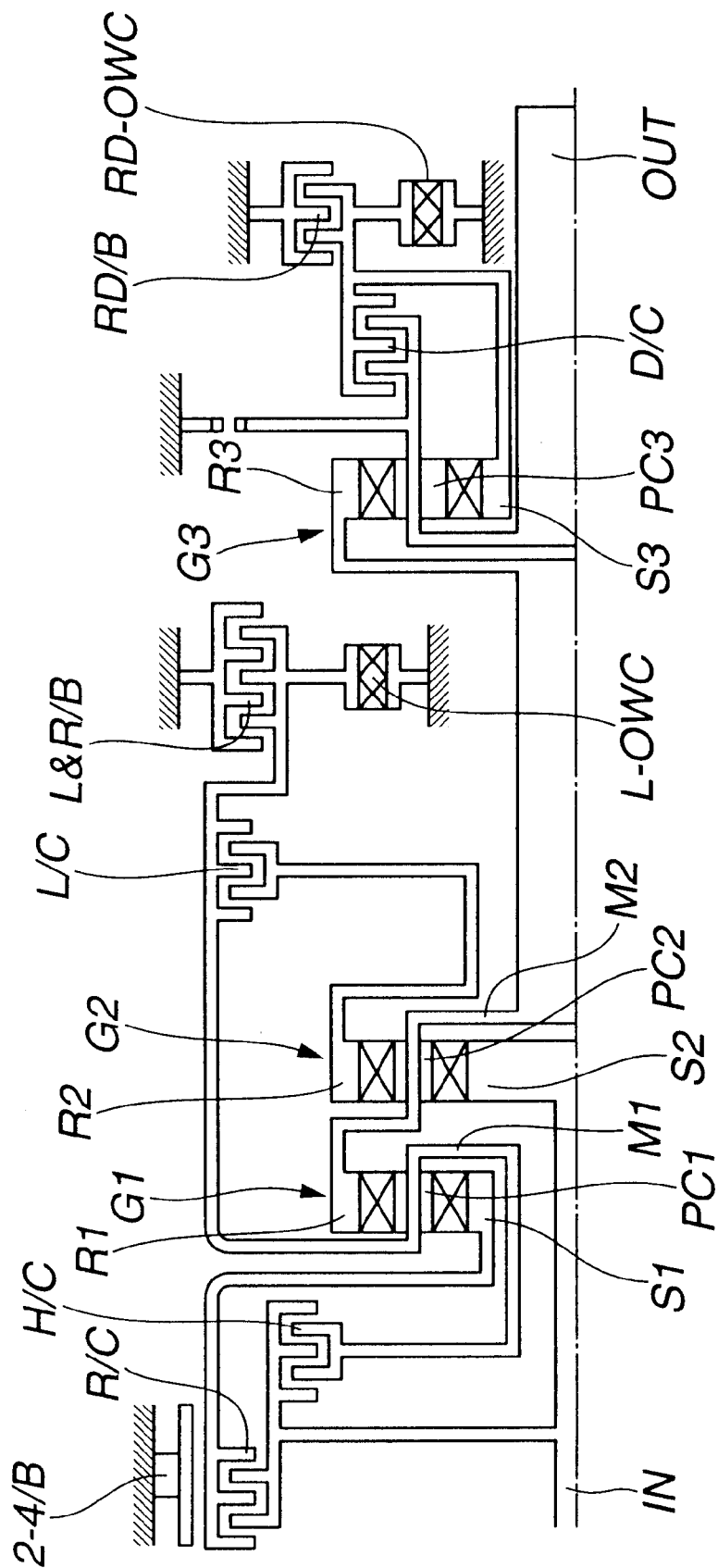
FIG. 2 is a schematic drawing illustrating the constitution of a step transmission or a speed change mechanism in the embodiments.

In the embodiment 1, a speed change mechanism 24 is provided with a gear type step transmission. FIG. 2 is a schematic drawing illustrating the constitution of the step transmission in the embodiment 1.

In FIG. 2, G1, G2, and G3 are planetary gears; M1 and M2 are coupling members; C1, C2, and C3 are clutches; B1, B2, B3, and B4 are brakes; F1, F2, and F3 are one-way clutches; IN is an input shaft (input member); and OUT is an output shaft (output member).

Said first planetary gear G1 is a single pinion type planetary gear comprising a first sun gear S1, a first ring gear R1, and a first carrier PC1 for supporting a pinion meshed with both gears S1, R1.

Said second planetary gear G2 is a single pinion type planetary gear comprising a second sun gear S2, a second ring gear R2, and a second carrier PC2 for supporting a pinion meshed with both gears S2, R2.

Said third planetary gear G3 is a single pinion type planetary gear comprising a third sun gear S3, a third ring gear R3, and a third carrier PC3 for supporting a pinion meshed with both gears S3, R3.

Said first coupling member M1 is a member for integrally coupling the first carrier PC1 to the second ring gear R2 through a low clutch L/C.

Said second coupling member M2 is a member for integrally coupling the first ring gear R1 to the second carrier PC2.

A reverse clutch R/C is engaged at the R range to connect the input shaft IN and the first sun gear S1.

A high clutch H/C is engaged at the third, fourth, and fifth speeds to connect the input shaft IN and the first carrier PC1.

The low clutch L/C is engaged at the first, second, and third gears to connect the first carrier PC1 and the second ring gear R2.

A direct clutch D/C is engaged at the fifth speed to connect the third carrier PC3 and the third sun gear S3.

A low and reverse brake L&R/B is engaged at the first speed and the R range to fix rotation of the first carrier PC1.

A 2-4 brake 2-4/B is engaged at the second, fourth, and fifth speeds to fix rotation of the first sun gear S1.

A reduction brake RD/B is engaged at the first, second, third, and fourth speeds and the R range to fix rotation of the third sun gear S3.

A low one-way clutch L-OWC is actuated when the vehicle is in acceleration at the first speed to fix rotation of the fist carrier PC1. It is not actuated during deceleration.

A reduction one-way clutch RD-OWC is actuated when the vehicle is in acceleration at the first, second, third, and fourth gears to fix rotation of the third sun gear S3. It is not actuated during deceleration.

Said input shaft IN is coupled to the first ring gear R1 so as to input engine torque through the torque converter 30. Said output shaft OUT is coupled to the third carrier PC3 so as to transfer output torque to driving wheels through a final gear and the like, not shown. Connected to each of said clutches and brakes is the hydraulic servo 23 for creating the engagement pressure and the release pressure at each gear.

[Speed Change Operation]

FIG. 3 is a drawing illustrating a table of engagement operation in the speed change mechanism 24 in the embodiment 1.

In FIG. 3, Δ denotes the state associated with torque transfer at power turned on, and ○ denotes the engagement state. As for the drive mode, the case where the range position of a select lever, not shown, is selected to the D range, and the case where the automatic speed change mode is selected in the automatic transmission having automatic and manual speed change modes are collectively called as drive mode.

Figure 4:
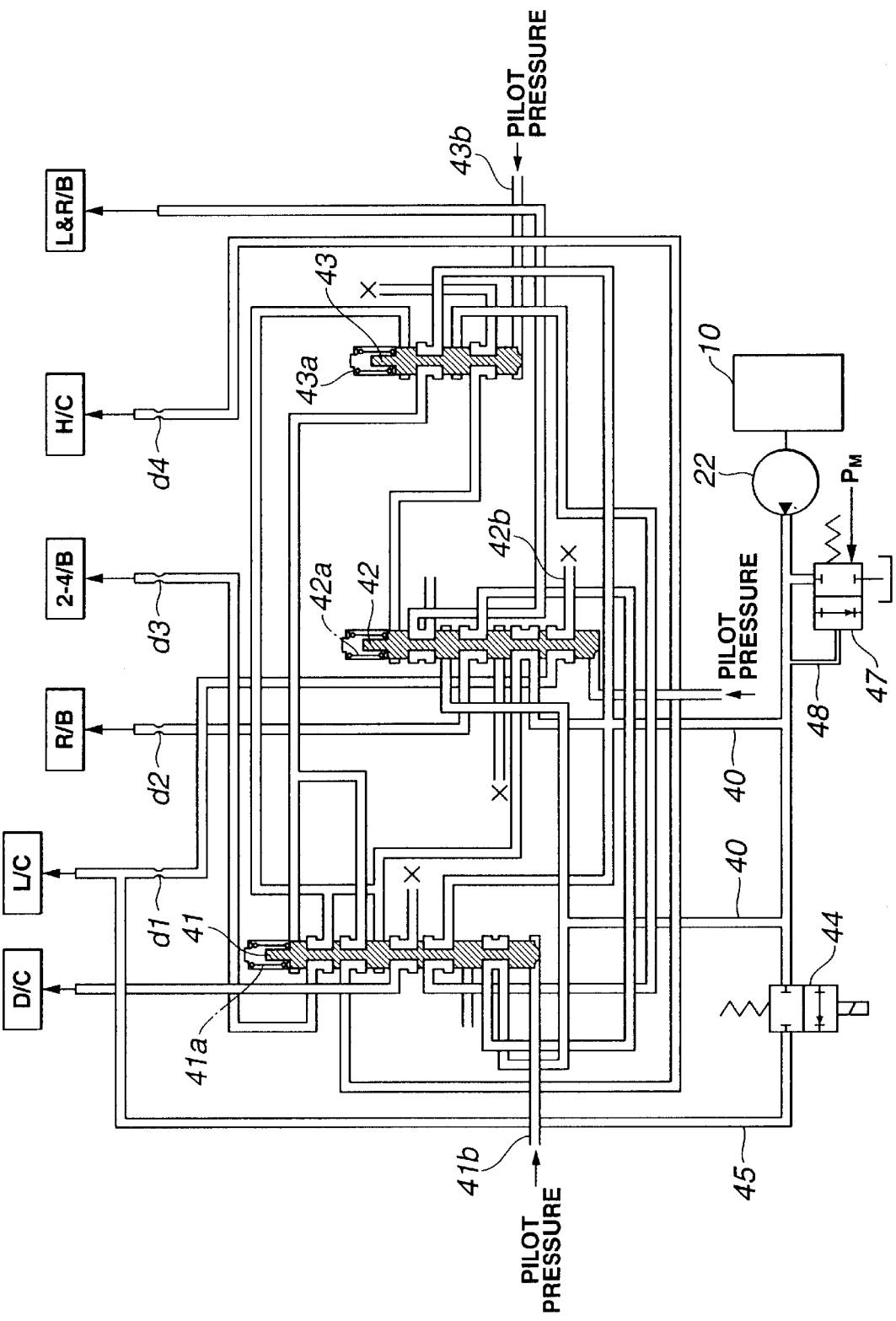
FIG. 4 is a circuit diagram illustrating a hydraulic circuit in the embodiment 1.

FIG. 4 is a hydraulic circuit diagram illustrating a hydraulic circuit for supplying the control hydraulic pressure from the hydraulic servo 23 to the speed change mechanism 24 in the embodiment 1. There are arranged main pump 22 driven by the engine 10, a pressure regulator valve 47 for regulating as the line pressure the discharge pressure of the main pump 22, a line-pressure circuit 40 for supplying the line pressure, a first shift valve 41, second shift valve 42, and third shift valve 43 for switching the hydraulic circuits, and pilot pressure circuits 41b, 42b, 43b for supplying the pilot pressures for operating the shift valves 41, 42, 43.

Moreover, the line-pressure circuit 40 is provided with a bypass hydraulic passage 45 connected to the point immediately before the low clutch L/C. Arranged on the bypass hydraulic passage 45 is the hydraulic-passage switching solenoid valve 44 for switching between the communicating state and the non-communicating state.

In order to prevent the surge pressure immediately after engagement of the engagement elements, orifices d1, d2, d3, d4 are arranged immediately before the low clutch L/C, the reverse brake R/B, the 2-4 brake 2-4/B, and the high clutch H/C to adjust the build up characteristics of the line pressure. Moreover, a hydraulic passage equivalent orifice diameter "d" of the hydraulic-passage switching solenoid valve 44 is set to be more than twice as large as the largest orifice diameter d2 of the orifices d1, d2, d3, d4.

Figure 6:
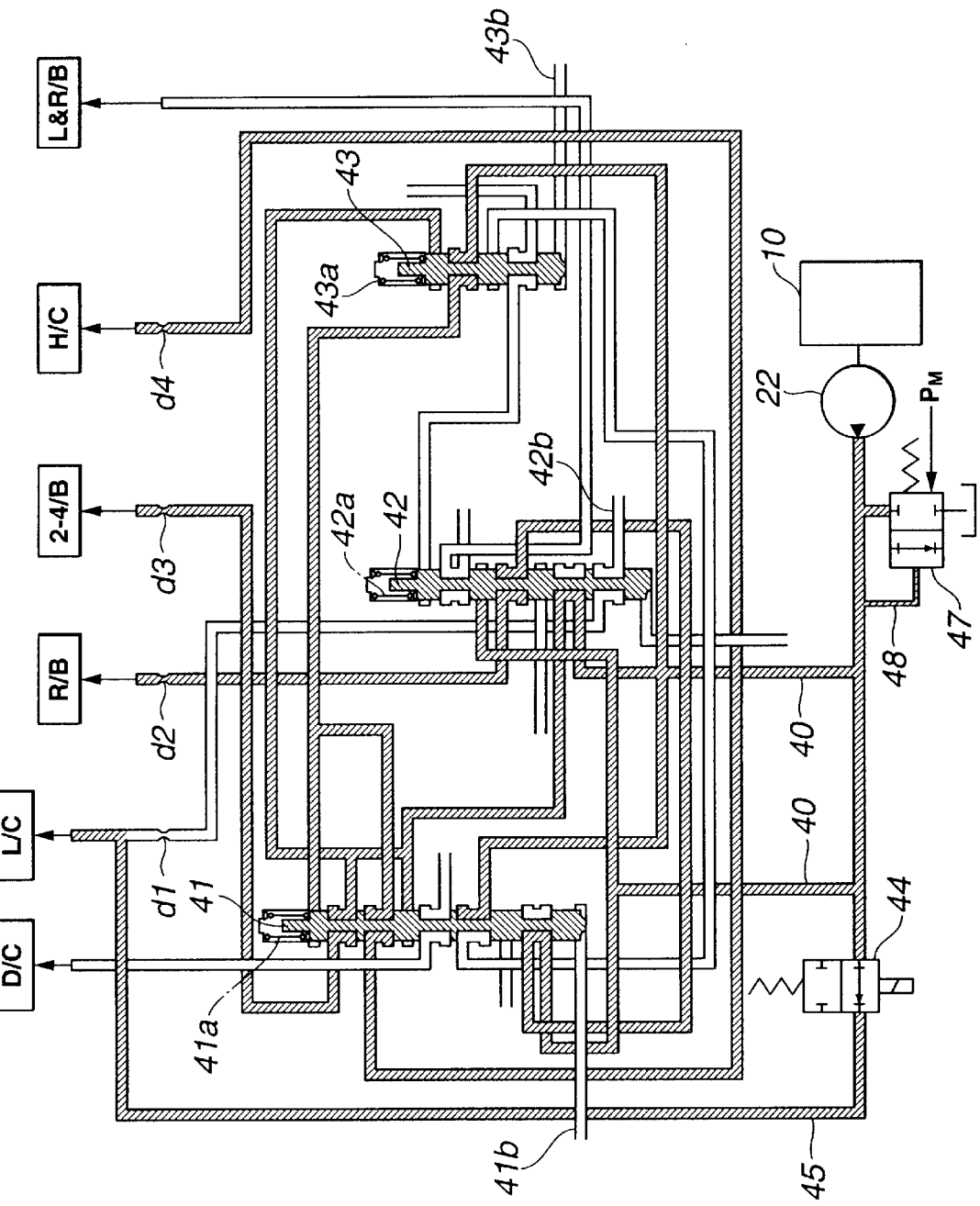
FIG. 6 is a circuit diagram illustrating oil flow immediately after engine restart in the embodiment 1.

Specifically, as shown in FIG. 6, in the state where the pilot pressures for the shift valves 41, 42, 43 are not supplied sufficiently, oil is provided to the reduction brake RD/B, the 2-4 brake 2-4/B, and the high clutch H/C to supply the oil amount proportional to the square of the orifice diameters d2, d3, d4 (d2>d3>d4) located on the hydraulic passage. Moreover, assuming that when oil is supplied to the low clutch L/C through the bypass hydraulic passage 45, the flow rate of oil supplied to the low clutch L/C is Q, and the pump discharge amount is Q1, $$d = 2d2$$

$$Q = 4d2^2 Q1/(4d2^2 + d2^2 + d3^2 + d4^2) > 4d2^2 Q1/(4d2^2 + d2^2 + d2^2 + d2^2)$$

$$= 4Q1/7 = 0.57\, Q1$$

It will be thus understood that about 60% of the discharge oil amount of the main pump can be supplied to the low clutch L/C.

Figure 5:
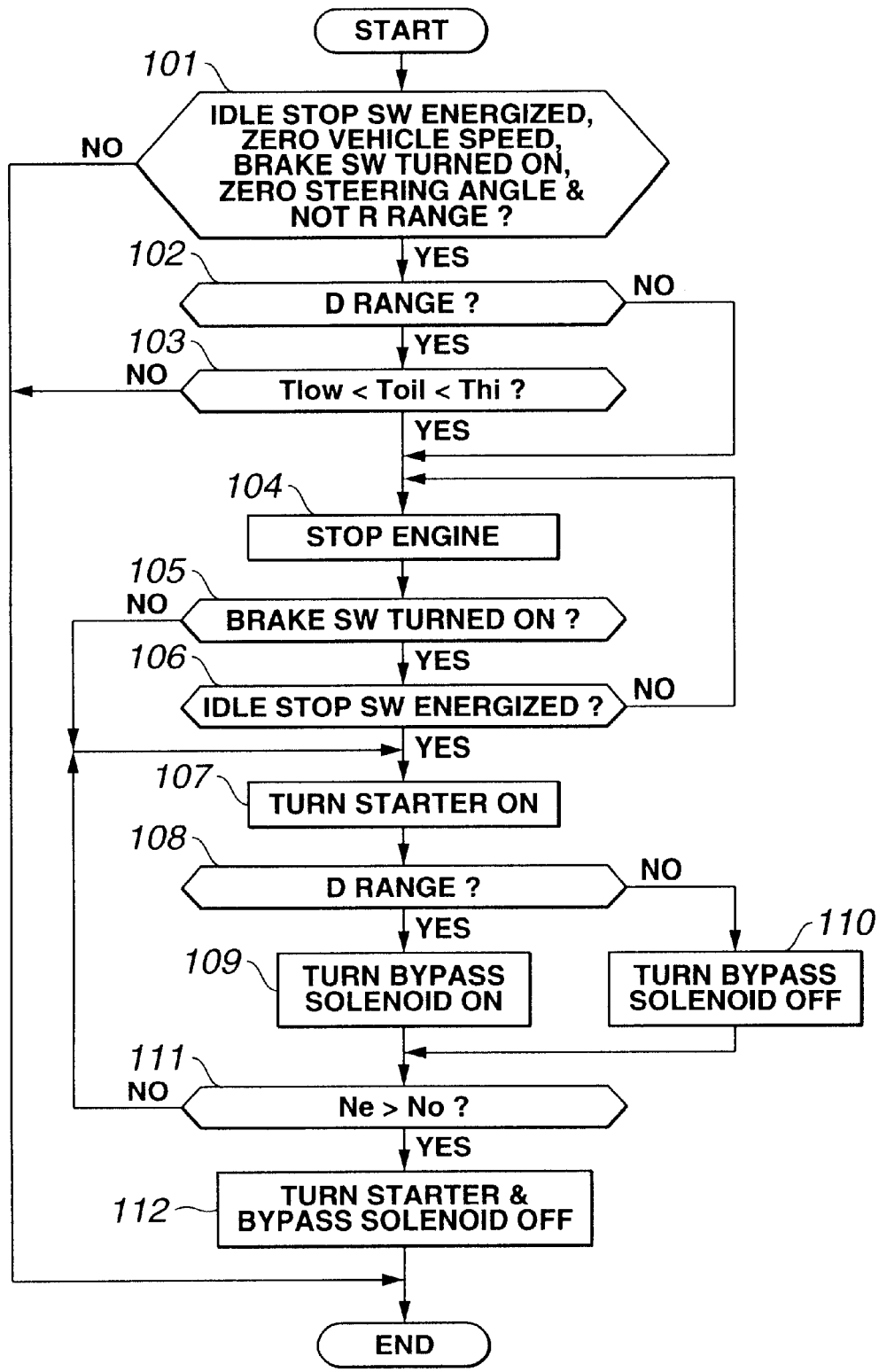
FIG. 5 is a flowchart illustrating idle stop control in the embodiment 1.

FIG. 5 is a flowchart illustrating the control contents of idle stop control in the embodiment 1.

At a step 101, it is determined whether or not the idle stop switch 1 is energized, the vehicle speed is zero, the brake switch is turned on, the steering angle is zero, and the range other than the R range is selected. Only when all the conditions are met, flow proceeds to a step 102. Otherwise, idle stop control is ignored.

At the step 102, it is determined whether or not the select position is the D range. If it is the D range, flow proceeds to a step 103. Otherwise, flow proceeds to a step 104.

At the step 103, it is determined whether or not an oil temperature Toil is higher than a lower limit oil temperature Tlow and lower than an upper limit oil temperature Thi. If the conditions are met, flow proceeds to a step 104. Otherwise, flow proceeds to the step 101.

At the step 104, the engine 10 is stopped.

At a step 105, it is determined whether or not the brake switch 2 is turned on. If it is in the ON state, flow proceeds to a step 106. Otherwise, flow proceeds to the step 104.

At the step 106, it is determined whether or not the idle stop switch 1 is energized. If it is not energized, flow proceeds to the step 104, whereas if it is energized, flow proceeds to a step 107.

At the step 107, the starter generator 60 is operated.

At a step 108, it is determined whether or not the select position is the D range. If it is the D range, flow proceeds to a step 109. Otherwise, flow proceeds to a step 110.

At the step 109, a solenoid of the hydraulic-passage switching solenoid valve 44 is turned on to switch the hydraulic passage to the supply side.

At the step 110, the solenoid of the hydraulic-passage switching solenoid valve 44 is turned off to switch the hydraulic passage to the non-supply side.

At a step 111, it is determined whether or not an engine speed Ne exceeds a predetermined engine speed No. If it exceeds No, flow proceeds to a step 112, whereas if not, flow proceeds to the step 105 to continue operation of the starter generator 60.

At the step 112, the starter generator 60 and the solenoid of hydraulic-passage switching solenoid valve 44 are turned off.

Specifically, if a driver wants idle stop control, the vehicle is at a standstill, the brake is depressed, the steering angle is zero, and the R range is not selected, the engine 10 is stopped. Here, the idle stop switch 1 is a device through which the driver transmits his/her intention to perform or release idle stop. At the point when turning an ignition key, this switch is in energization. The reason why it is required that the steering angle is zero is to prohibit idle stop at temporary stop of the running vehicle at right-hand turn and the like, for example.

Moreover, the reason why idle stop control is prohibited at the R range is that the sufficient oil amount cannot be supplied since the required oil amount for achieving the engagement completion state becomes far larger than that in the first speed engagement state.

Specifically, as shown in the engagement table in FIG. 3, at the first speed, the low clutch L/C and the reduction brake RD/B need supply of the hydraulic pressure. Even in the state where the shift valves do not switch the hydraulic passages, the hydraulic pressure is supplied to the reduction brake RD/B, and thus the hydraulic pressure needs to be supplied to the other part or the low clutch L/C only through the bypass hydraulic passage. However, at the R range, the hydraulic pressure should also be supplied to the reverse clutch R/C and the low and reverse brake L&R/B, and thus it is difficult to supply the oil amount required for engagement before engine start.

Next, it is determined whether or not the oil temperature Toil is higher than the lower limit oil temperature Tlow and lower than the upper limit oil temperature Thi. This is because unless the oil temperature is greater than a predetermined temperature, the viscosity resistance of oil may not allow a predetermined oil amount to be charged before engine complete explosion. Moreover, this is because a decrease in volumetric efficiency of the main pump 22 and an increase in leakage amount at valve parts due to reduction in viscosity resistance may not allow a predetermined oil amount to be charged before engine complete explosion in the same way.

Next, when the brake is released, it is determined that the driver has his/her intention to start the engine. Moreover, even with the brake depressed, if it is shown that the idle stop switch 1 is not energized, it is determined that the driver has his/her intention to start the engine. This aims to prevent the situation of impossible use of an air conditioner and the like due to a load applied to the battery when the engine 10 is stopped for idle stop, for example. That is, when the driver feels that the temperature in the cabin is high, idle stop control can be released based on driver's intention, performing control in further conformity with driver's intention. With this, the starter generator 60 is actuated to supply the hydraulic pressure to the line-pressure circuit 40.

And the solenoid of the hydraulic-passage switching solenoid valve 44 arranged on the bypass hydraulic passage 45 for ensuring communication between the main pump 22 and the point immediately before the low clutch L/C is turned on and switched to the communication state. Specifically, at engine stop, oil supplied to the low clutch L/C is discharged from the hydraulic passage, leading to lowered hydraulic pressure. As a result, when the engine 10 is restarted, the low clutch L/C to be engaged at first speed running is in disengagement, requiring supply of the hydraulic pressure at engine restart.

Next, at engine restart, rotation of the starter generator 60 causes the main pump 22 to drive through the engine 10. FIG. 6 shows oil flow immediately after this driving. In such a way, the pilot pressures for operating the shift valves 41, 42, 43 are not supplied sufficiently, so that oil flows in the hatched portions in FIG. 6. At this time, the hydraulic-passage switching solenoid valve 44 is in communication, and thus oil is also supplied to the low clutch L/C. And when the main pump 22 becomes in the state to allow supply of sufficient hydraulic pressure after engine start, the low clutch L/C is surely engaged as shown in the hatched portions in FIG. 7.

If this low clutch L/C is not engaged quickly, the accelerator pedal is depressed in the neutral state as it were, which may produce an engagement shock by engagement of the low clutch L/C with the engine 10 at full throttle. Thus, the hydraulic pressure is supplied in advance through the bypass hydraulic passage 45, solving the above-mentioned problem.

And the starter generator 60 is actuated to have the engine speed Ne exceeding the predetermined value No. When it exceeds No, operation of the starter generator 60 is stopped to switch the hydraulic-passage switching solenoid valve 44 to the non-communication state.

As described above, with the control system for an automatic transmission in the embodiment 1, adoption of the above-mentioned constitution allows elimination of an electric assist pump and the like in the prior art, removing the situation that when idle stop control stops idle of the engine 10, the electric motor is not continuously operated during idle stop as well. Therefore, idle stop control can be performed without applying a load to the battery and the electric motor and at low cost.

Figure 11:
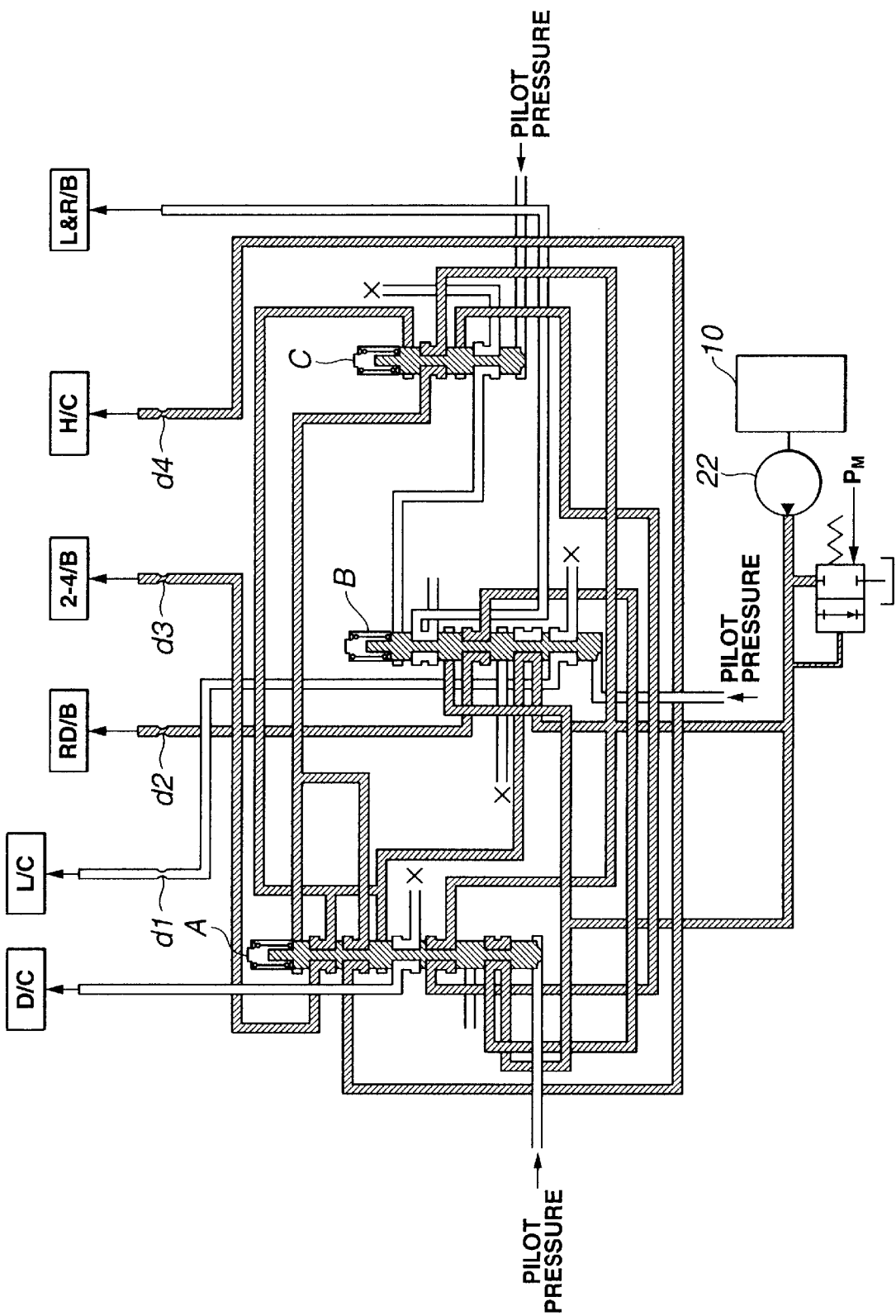
FIG. 11 is a circuit diagram illustrating a hydraulic circuit in the prior art.

Moreover, the bypass hydraulic passage 45 is arranged to ensure communication between the main pump 22 and the point immediately before the low clutch L/C, and the hydraulic-passage switching solenoid valve 44 is arranged on the bypass hydraulic passage 45 to switch between the communication state and the non-communication state. Specifically, in the conventional hydraulic circuit for an automatic transmission, as shown in FIG. 11, for example, shift valves A, B, C are arranged to perform switching of the hydraulic passages so as to supply the hydraulic pressure produced in the oil pump to the engagement elements. The shift valves are actuated to switch the hydraulic passages, allowing engagement of the engagement elements. At first speed start, for example, the pilot pressures are supplied to the shift valves A, B, C to supply the engagement pressures to the low clutch L/C and the reduction brake RD/B.

However, switching of the hydraulic passages by the shift valves needs a certain hydraulic pressure, which is produced after charging oil in the hydraulic passages having oil discharged therefrom once, requiring certain time for charging oil. As a result, if switching of the hydraulic passages is not performed by the shift valves, the hydraulic pressure is supplied to the reduction brake RD/B, the 2-4 brake 2-4/B, and the high clutch H/C as shown by the hatched portions in FIG. 11, achieving the fourth speed state.

Then, in the embodiment 1, as shown in FIG. 6, the bypass hydraulic passage 45 is arranged in the low clutch L/C for achieving first speed engagement so as to supply oil to the hydraulic passages having oil discharged therefrom without waiting switching of the hydraulic passages by the shift valves 41, 42, 43, through which oil is directly supplied to the point immediately before the low clutch L/C, allowing quick supply of sufficient engagement pressure.

Figure 7:
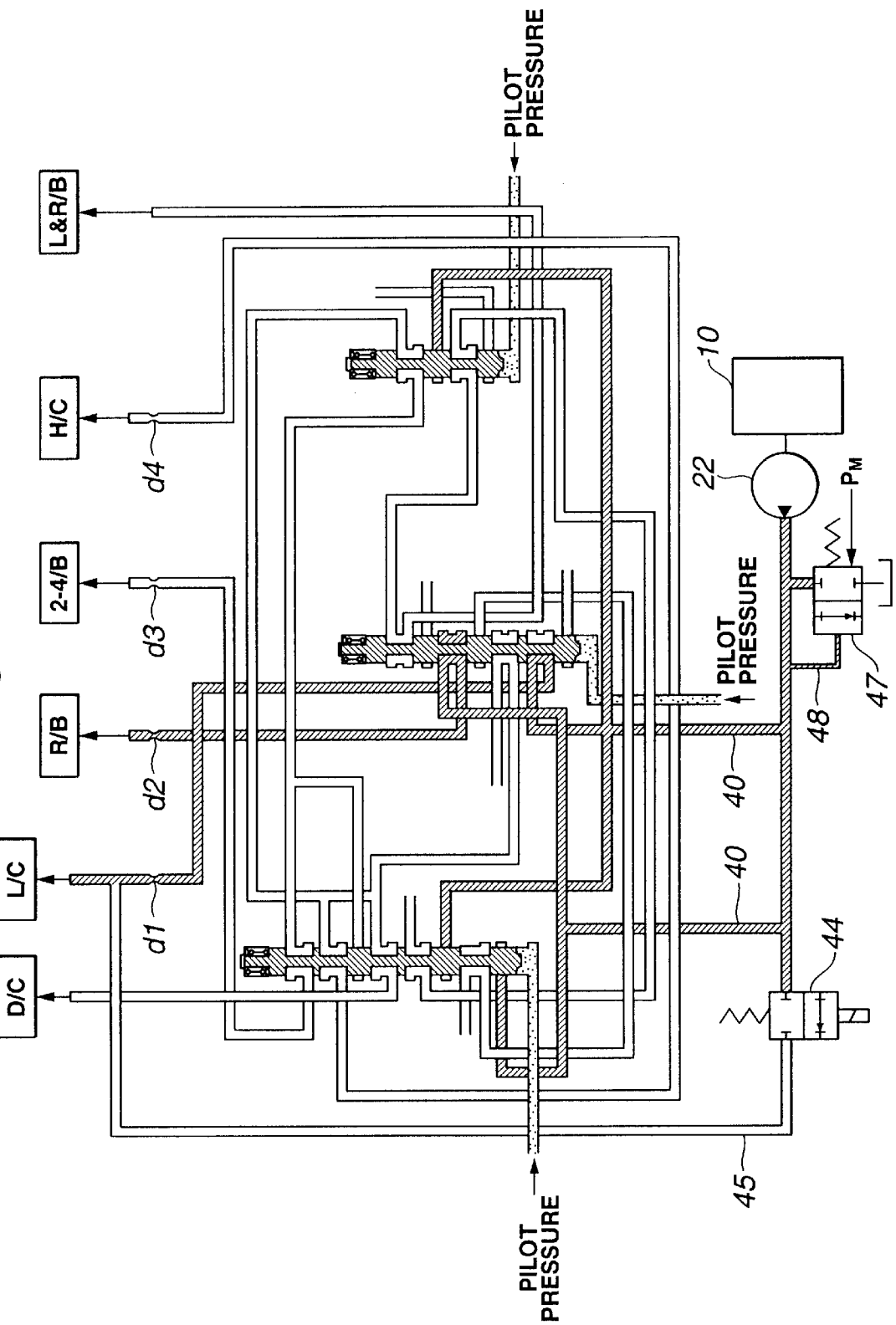
FIG. 7 is a circuit diagram illustrating oil flow after supply of the pilot pressure in the embodiment 1.

Moreover, by stopping driving of the starter generator 60 by engine restart (i.e. in the state where the main pump 22 is driven by the engine 10 to secure sufficient hydraulic pressure), the hydraulic-passage switching solenoid valve 44 is switched to the non-communication state so as to allow supply of only the required hydraulic pressure to the low clutch L/C as shown in FIG. 7. Thus, during normal running, smooth running can be achieved without having an influence on speed change control of the automatic transmission and the like.

Further, the hydraulic passage equivalent orifice diameter "d" of the hydraulic-passage switching solenoid valve 44 is set to be more than twice as large as the largest one d2 of the orifice diameters d2, d3, d4, allowing supply of more than 60% of the discharge oil amount of the main pump 22 to the low clutch L/C. Therefore, sufficient oil amount can be supplied at engine restart, achieving smooth running.

Still further, when the select position is at the R range, idle stop control is prohibited. Specifically, as shown in the engagement table in FIG. 3, at the first speed, the hydraulic pressure should be supplied to the low clutch L/C and the reduction brake RD/B. Even in the state where the shift valves do not switch the hydraulic passages, the hydraulic pressure is supplied to the reduction brake RD/B, and thus the hydraulic pressure needs to be supplied to the other part or the low clutch L/C only through the bypass hydraulic passage. However, at the R range, the hydraulic pressure should also be supplied to the reverse clutch R/C and the low and reverse brake L&R/B, and thus it is difficult to supply the oil amount required for engagement before engine start.

Then, at the R range, idle stop control is prohibited, allowing a reduction in start shock and the like at reverse running.

Furthermore, idle stop control is prohibited when the oil temperature is not within a predetermined range. Specifically, when the oil temperature is too low, the viscosity resistance of oil becomes too high, resulting in impossible supply of sufficient oil amount before engine start. On the other hand, when the oil temperature is too high, the oil viscosity becomes too low, causing a decrease in volumetric efficiency of the main pump 22 and an increase in leakage amount at the valve parts, resulting in impossible supply of sufficient oil amount in the same way. Therefore, with idle stop control being prohibited when the oil temperature is not within a predetermined range, the engine is not stopped except when oil can surely be supplied at engine restart, allowing achievement of smooth idle stop control.

[Embodiment 2]

Figure 8:
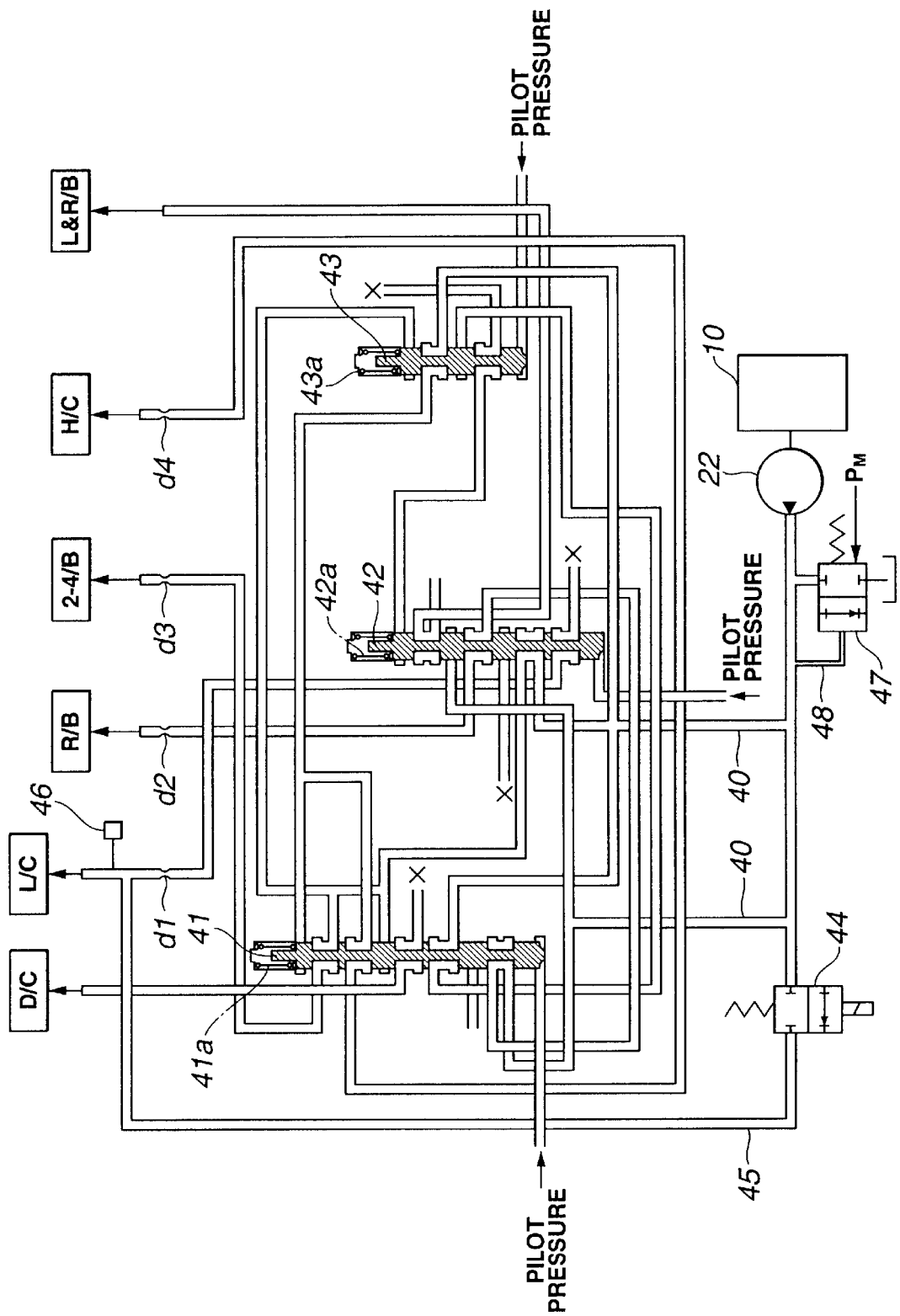
FIG. 8 is a circuit diagram illustrating a hydraulic circuit in the embodiment 2.

FIG. 8 is a schematic drawing illustrating a hydraulic circuit for supplying the control hydraulic pressure from the hydraulic servo 23 to the hydraulic circuit in the embodiment 2. The fundamental constitution is the same as that of the embodiment 1, but is different therefrom in that a low-clutch pressure detecting sensor 46 is arranged between the low clutch L/C and the bypass circuit 45 to detect the engagement pressure of the low clutch L/C.

Figure 9:
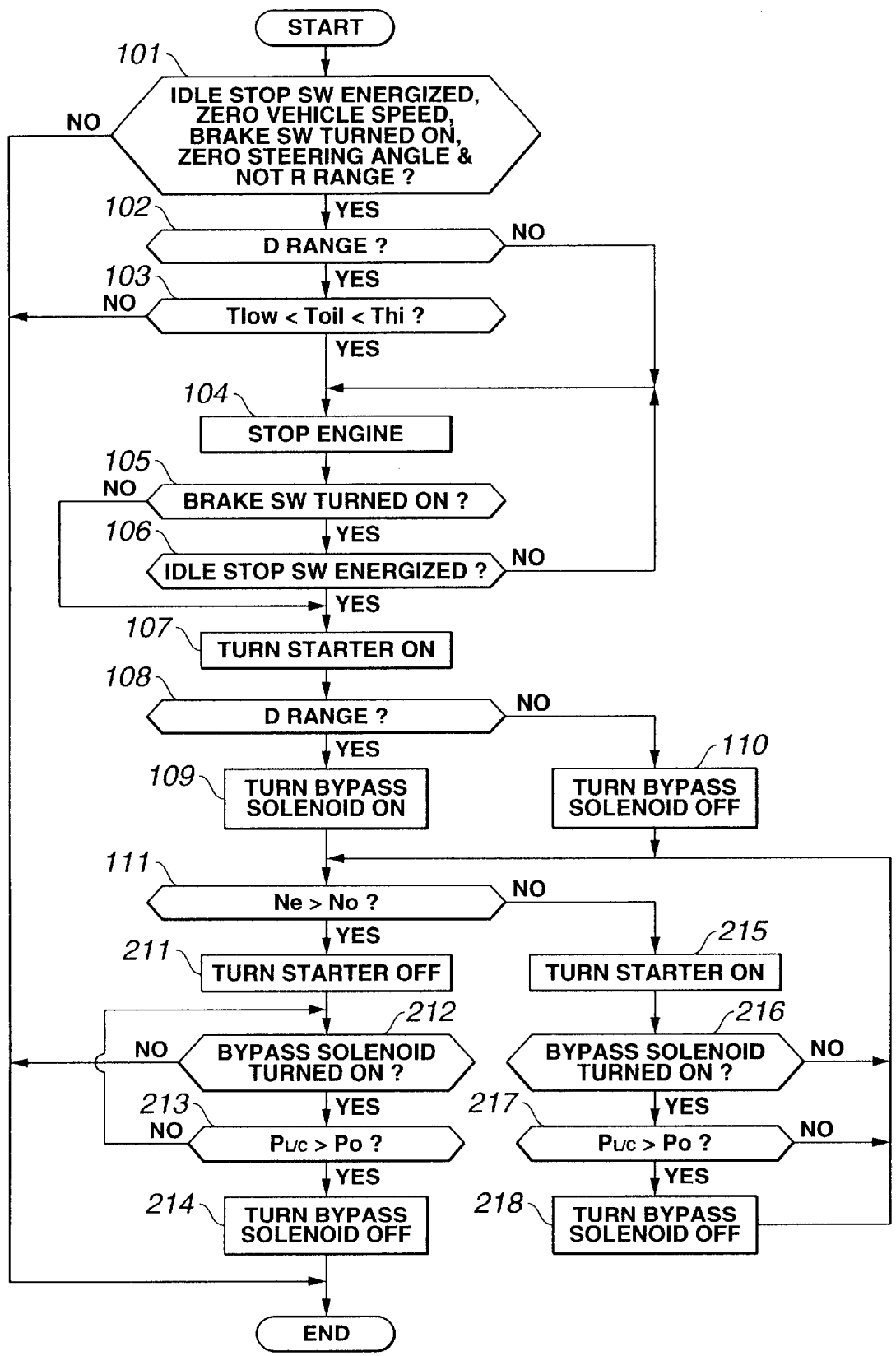
FIG. 9 is a flowchart illustrating idle stop control in the embodiment 2.

FIG. 9 is a flowchart illustrating the control contents of idle stop control in the embodiment 2. Since the step 101 to the step 111 are the same, only different steps are described.

At a step 211, the starter generator 60 is stopped.

At a step 212, it is determined whether or not the solenoid of the hydraulic-passage switching solenoid valve 44 is turned on. If it is turned on, flow proceeds to a step 213. Otherwise, the control is finished.

At the step 213, it is determined whether or not a low-clutch pressure PL/C detected by the low-clutch pressure detecting sensor 46 is greater than a target clutch pressure Po. If it is greater than Po, flow proceeds to a step 214. Otherwise, the step is repeatedly carried out until the low-clutch pressure PL/C becomes greater than the target clutch pressure Po.

At the step 214, the solenoid of the hydraulic-passage switching solenoid valve 44 is turned off to switch the bypass hydraulic passage 45 to the non-supply side.

At a step 215, the starter generator 60 is actuated.

At a step 216, it is determined whether or not the solenoid of the hydraulic-passage switching solenoid valve 44 is turned on. If it is turned on, flow proceeds to a step 217. Otherwise, flow proceeds to the step 111.

At the step 217, it is determined whether or not the low-clutch pressure PL/C detected by the low-clutch pressure detecting sensor 46 is greater than the target clutch pressure Po. If it is greater than Po, flow proceeds to a step 218. Otherwise, flow proceeds to the step 111.

At the step 218, the solenoid of the hydraulic-passage switching solenoid valve 44 is turned off to switch the bypass hydraulic passage 45 to the non-supply side.

Specifically, the starter generator 60 is actuated to have the engine speed Ne exceeding the predetermined value No. When it exceeds the predetermined value No, operation of the starter generator 60 is stopped. If the hydraulic-passage switching solenoid valve 44 is in the communication state, it is determined whether or not the low-clutch pressure PL/C detected by the low-clutch pressure detecting sensor 46 reaches the target clutch pressure Po. If it reaches the target clutch pressure Po, the hydraulic-passage switching solenoid valve 44 is put in the non-communication state, and the control is finished.

Moreover, the starter generator 60 is actuated to have the engine speed Ne exceeding the predetermined value No. When it does not exceed the predetermined value No, operation of the starter generator 60 is continued. If the hydraulic-passage switching solenoid valve 44 is in the communication state, it is determined whether or not the low-clutch pressure PL/C detected by the low-clutch pressure detecting sensor 46 reaches the target clutch pressure Po. If it reaches the target clutch pressure Po, the hydraulic-passage switching solenoid valve 44 is put in the non-communication state to actuate the starter generator 60 until the engine speed Ne becomes the predetermined value.

Therefore, by detecting the low-clutch pressure PL/C by the low-clutch pressure detecting sensor 46, and if it reaches the target low-clutch pressure Po even during operation of the starter generator 60, the hydraulic-passage switching solenoid valve 44 can be put in the non-communication state. If the required engagement pressure is ensured, it is not necessary to supply oil further from the bypass hydraulic passage 45.

Therefore, detection of the low-clutch pressure PL/C allows the bypass hydraulic passage 45 to be put in the non-communication state with optimum timing, resulting in efficient use of the discharge oil amount of the main pump 22.

[Embodiment 3]

Figure 10:
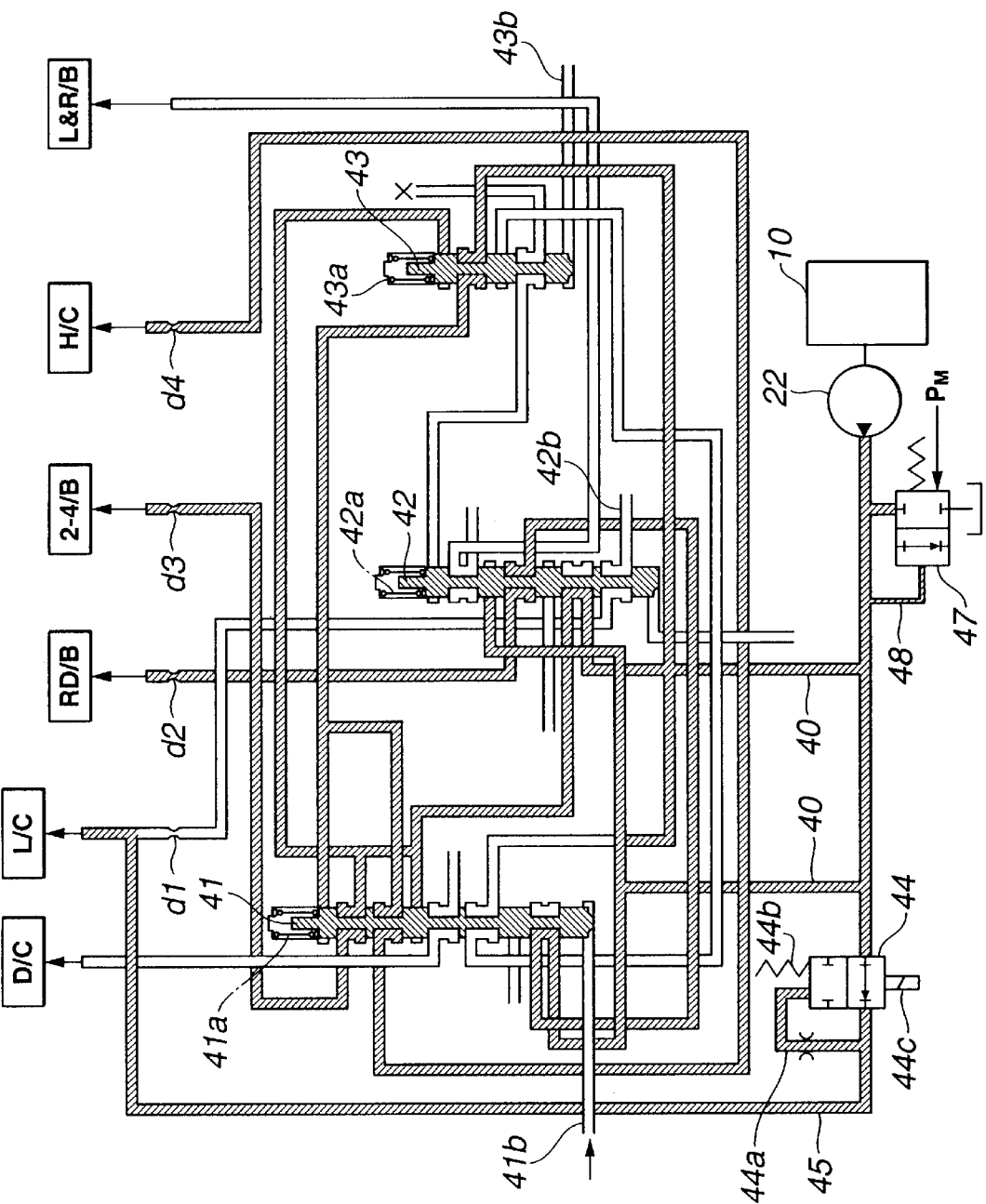
FIG. 10 is a circuit diagram illustrating a hydraulic circuit in the embodiment 3.

FIG. 10 is a schematic drawing illustrating a hydraulic circuit for supplying the control hydraulic pressure from the hydraulic servo 23 to the hydraulic circuit in the embodiment 3. The fundamental constitution is the same as that of the embodiment 1, and only different points are described in detail.

The hydraulic-passage switching solenoid valve 44 arranged on the bypass circuit 45 is a solenoid valve comprising a return spring 44b and an electromagnetic solenoid 44c generating an electromagnetic force opposite to the return spring 44b. And a feedback-pressure circuit 44a is arranged which can supply a hydraulic-pressure force opposite to an electromagnetic force of the electromagnetic solenoid 44c from the downstream side of the hydraulic-passage switching solenoid valve 44. With this, even if the control unit 50 outputs a signal for maintaining the communication state of the bypass circuit 45 during a predetermined time period, for example, if the hydraulic pressure supplied from the feedback-pressure circuit 44a reaches a predetermined oil pressure, the bypass circuit 45 can be put in the non-communication state without waiting an OFF signal of the electromagnetic solenoid out of the control unit 50, achieving switching control of the hydraulic-passage switching solenoid valve 44 with optimum timing. It is noted that control flow is the same as that in the embodiment 1, and thus a description thereof is omitted.

In the embodiment 2, there is arranged low-clutch pressure detecting sensor 46, and in accordance with its sensor value, switching control of the hydraulic-passage switching solenoid valve 44 is performed. On the other hand, in the embodiment 3, the use of the feedback pressure allows switching control with optimum timing without requiring a sensor and the like, leading to simplification of control and reduction in cost.

[Embodiment 4]

Figure 12:
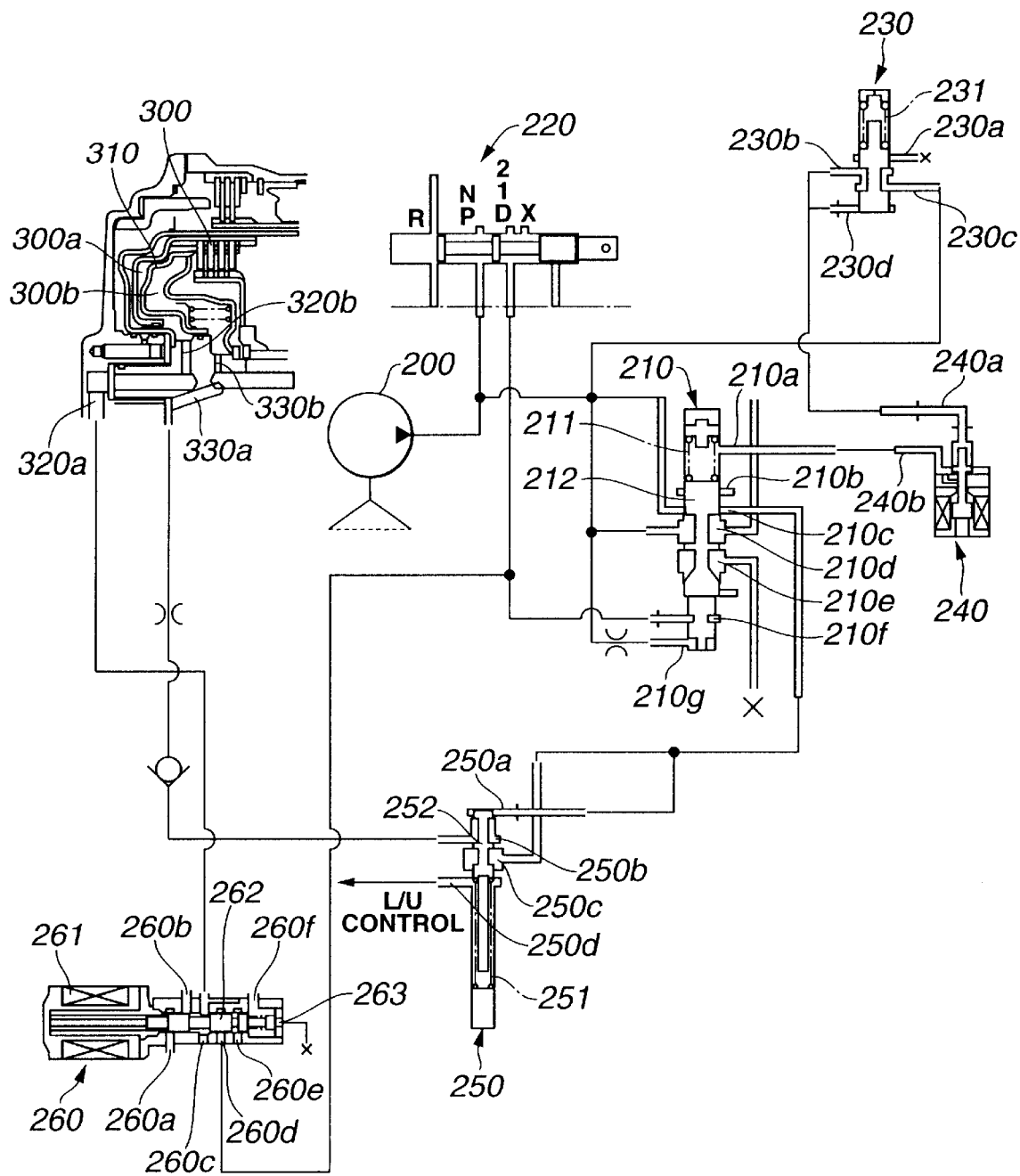
FIG. 12 is a circuit diagram illustrating a hydraulic circuit in the embodiment 4.

FIG. 12 is a schematic drawing illustrating a hydraulic circuit in the embodiment 4. The discharge pressure of a pump 200 driven by the engine is led to ports 210c, 210d, 210g of a line-pressure regulator valve 210. Moreover, the discharge pressure is led to a port 230c of a pilot valve 230 for reducing the pump discharge pressure at a predetermined pressure. A PL solenoid 240 is a three-way duty valve which uses the discharge pressure of the pilot valve 230 (the output pressure from a port 230b) as a supply source to output to a port 240b the pressure in accordance with the duty ratio.

The port 240b of the duty valve has the hydraulic pressure adjusted and determined by a balance between a spring force of a spring 211 acting upward of a spool valve 212 of the line-pressure regulator valve 210, a hydraulic-pressure force due to the hydraulic pressure set by the duty valve 240, and a hydraulic-pressure force due to the pump discharge pressure acting on the port 210g and a port 210f (when the manual valve is at the D range) in the lower side of the spool valve 212.

This line pressure is led to a supply-pressure port 260d of a three-way proportional pressure reducing valve 260. Ports 260a, 260b, 260f are drain ports.

A load proportional to a value of current supplied to a solenoid 261 of the three-way proportional pressure reducing valve 260 acts on a left end of a spool valve 262. In order to obtain the hydraulic pressure determined by a balance between a spring force of a spring 263 disposed at a right end of the spool valve 262 and a hydraulic-pressure force of a feedback-pressure port 260e, the hydraulic pressure of a control-pressure port 260c is adjusted.

This control hydraulic pressure is led to a piston hydraulic chamber 300a of a forward clutch 300 via ports 320a, 320b. As another piston chamber of the forward clutch 300, a cancel hydraulic chamber 300b is disposed to cancel the centrifugal hydraulic pressure.

Part of the line pressure is led to ports 250a, 250c of a torque-control relief valve 250 via the port 210c of the line-pressure regulator valve. If a hydraulic-pressure force due to the line pressure acting upward of a spool valve 252 is greater than a spring force of a spring 251 disposed in the lower side of the spool valve 252, the port 250b is opened to lead the line pressure as lubrication pressure to the cancel hydraulic chamber via ports 330a, 330b.

Figure 13:
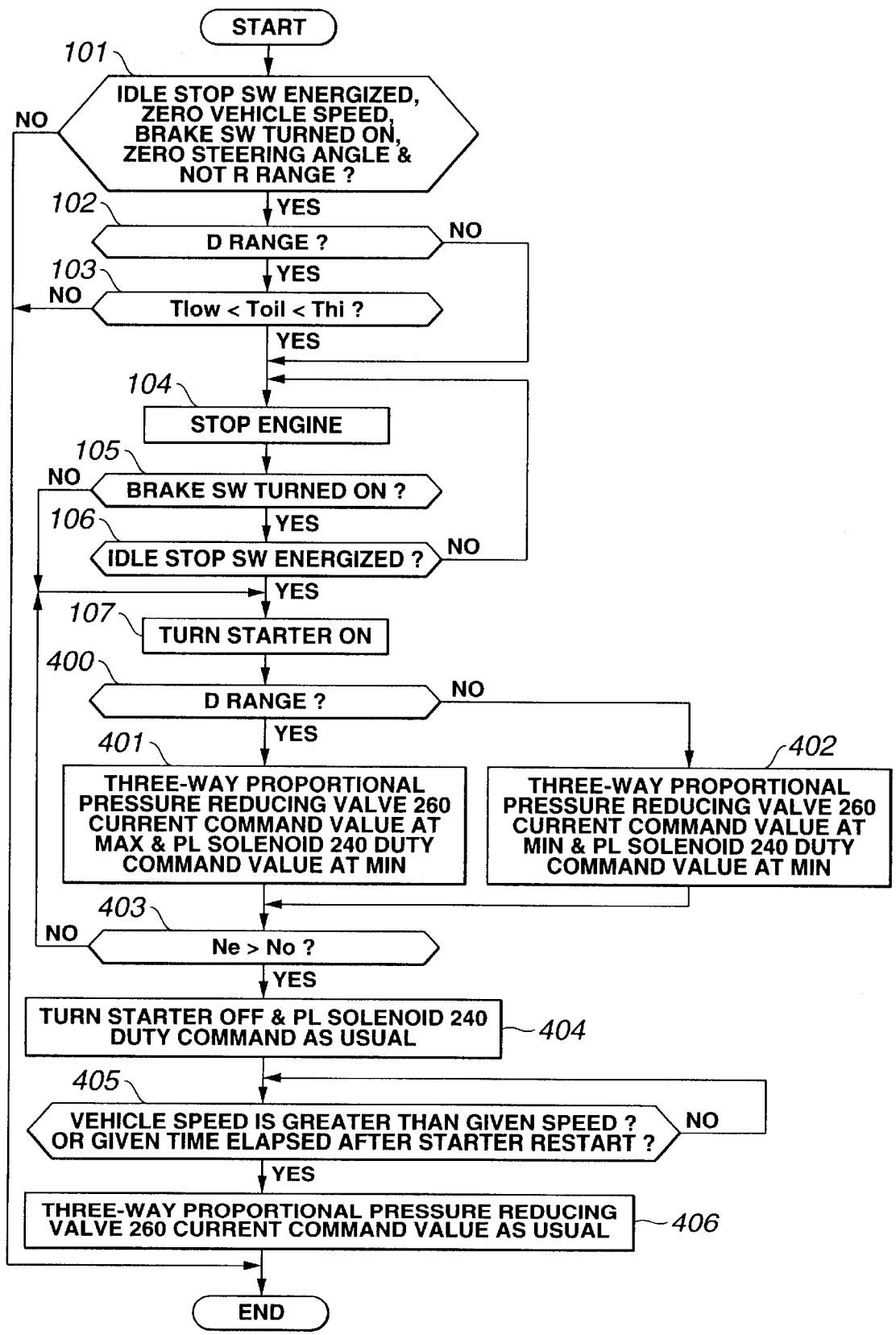
FIG. 13 is a flowchart illustrating idle stop control in the embodiment 4.

FIG. 13 is a flowchart illustrating the control contents of idle stop control in the embodiment 4. Since the step 101 to the step 107 are the same as in the other embodiments, only different steps are described.

At a step 400, it is determined whether or not the select position is at the D range. If it is at the D range, flow proceeds to a step 401. Otherwise, flow proceeds to a step 402.

At the step 401, a current value of the three-way proportional pressure reducing valve 260 is set at a maximum, whereas the duty ratio of the PL solenoid 240 is set at a minimum.

At the step 402, a current command value of the three-way proportional pressure reducing valve 260 is OFF, whereas a duty-ratio command value of the PL solenoid 240 is set at a maximum.

At a step 403, it is determined whether or not the engine speed Ne exceeds the predetermined engine speed No. If it exceeds No, flow proceeds to a step 404, whereas if not, flow proceeds to the step 105 to continue operation of the starter generator 60.

At the step 404, operation of the starter generator 60 is stopped, and a duty-ratio command value of the PL solenoid 240 is set as usual.

At a step 405, it is determined whether or not a given time elapses after engine restart, or the vehicle speed becomes a predetermined value after engine restart. If the conditions are met, flow proceeds to a step 406. This step 405 is repeatedly carried out until the conditions are met.

At the step 406, a current command value of the three-way proportional pressure reducing valve 260 is set as usual.

Specifically, at the D range, when a starter restart command is issued, a current value of the three-way proportional pressure reducing valve 260 is set at a maximum with a starter restart command as a trigger.

In this state, the duty ratio of the PL solenoid is set at a minimum to set pressure regulating of the line pressure at a minimum. With starter restart, the pump 200 discharges a flow rate determined by an engine cranking revolution speed. Since this discharge amount is lower than a set hydraulic pressure of the line-pressure regulator valve 210, the discharge amount having leakage amount removed is led to the supply pressure port 260d of the three-way proportional pressure reducing valve 260 without being relieved at the line-pressure regulator valve 210 (the torque-control relief valve 250 is not opened as well).

Since a current command of the three-way proportional pressure reducing valve 260 is maximum, the openings of the control-pressure port 260c and the supply-pressure port 26d become maximum. Thus, the pump discharge pressure is led to the piston chamber 300a of the forward clutch 300 through a very small passage resistance, allowing engagement of the forward clutch before engine complete explosion. This is due to the fact that the hydraulic pressure or oil is fully charged within the piston chamber 300a of the forward clutch 300 even in the idle stop state as well, since the above-mentioned hydraulic-passage resistance is small, and the piston chamber includes a centrifugal cancel mechanism.

Next, as for the timing of returning a current command of this three-way proportional pressure reducing valve to a command value in accordance with an engine load at normal D range running, it may be simultaneous with stop of starter restart. However, since complete engagement of the forward clutch cannot be finished due to dispersion of build up of the hydraulic pressure of the forward clutch, a current command is returned to a normal command after a given time elapses after restart, or the vehicle speed becomes a predetermined value after restart. Such control prevents a shock from occurring even if the driver performs start operation immediately after engine complete explosion.

The reason why the duty ratio of the PL solenoid 240 is set at a minimum is to enhance the pump volumetric efficiency anywise by reducing a pump load during engine cranking, and to shorten a time period up to engine complete explosion. A duty-ratio minimum value command is relieved together with stop of starter restart, and is returned to a command value in accordance with an engine load at normal D range running.

As described above, in the embodiment 4, since the method is adopted which directly controls the forward-clutch hydraulic pressure by the three-way proportional pressure reducing valve, there is no need to interpose a normal N-D select shock tuning accumulator and an orifice in the forward-clutch hydraulic pressure, leading to no formation of a passage resistance for oil charging to the forward-clutch piston chamber during engine cranking.

Moreover, even in the state where the pump discharge pressure is not generated sufficiently, the forward-clutch pressure can be set with an electromagnetic force. Thus, during a period where the pump discharge pressure is insufficient, communication between the supply-pressure port and the control-pressure port is fully opened to ensure the discharge amount required for engagement, obtaining quick engagement of the forward engagement elements, allowing achievement of smooth running.

In the embodiment 4, during engine cranking, current setting of the three-way proportional pressure reducing valve is set at a maximum. However, setting at a maximum is not indispensable, if it can be obtained the hydraulic pressure greater than a set hydraulic pressure required for complete engagement of the forward clutch.

Moreover, there is no electric assist pump and the like in the prior art, so that when engine idle is stopped by idle-stop control means, the electric assist pump is not continuously operated during idle stop as well. Therefore, idle stop control can be performed without applying a load to the battery and the electric motor and at low cost.

Further, by directly supplying oil to the hydraulic passages having oil discharged therefrom without waiting switching of the hydraulic passages by the shift valves, sufficient engagement pressure can quickly be supplied to the engagement elements. With this, the forward engagement elements are engaged quickly, preventing a problem of producing an engagement shock by engagement of the forward clutch with the engine at full throttle.

Having described the embodiments 1, 2, 3, and 4, the invention of the present application is not limited to the above-mentioned constitution, and is applicable not only to the low clutch, but to any other forward engagement elements of the automatic transmission. Moreover, the above-mentioned embodiments show the case where the invention is applied to the forward engagement elements of the step automatic transmission. Alternatively, the invention can be applied to the forward engagement elements of a stepless transmission.

What is claimed is:

1. A control system for an automatic transmission in a vehicle comprising:
    an engine including a starter motor for start and idle-stop control means for outputting signals for idle operation and stop for the engine to an engine control unit in accordance with preset idle stop conditions and on the basis of a vehicle speed signal sensed by a vehicle speed sensor, a steering angle signal sensed by a steering angle sensor, a signal out of brake operation detecting means for detecting brake operation and the like; and
    an automatic transmission for performing speed change control using as a hydraulic-pressure supply source a main pump driven by said engine, characterized by
        arranging a bypass hydraulic passage for ensuring communication between said main pump and a point immediately before an engagement-pressure supply port of a forward engagement element in the automatic transmission, a switching valve on said bypass hydraulic passage to allow switching between a communication state and a non-communication state, and switching-valve control means for switching said switching valve between the communication state and the non-communication state.

2. A control system for an automatic transmission in a vehicle comprising:
    an engine including a starter motor for start and idle-stop control means for outputting signals for idle operation and stop for the engine to an engine control unit in accordance with preset idle stop conditions and on the basis of a vehicle speed signal sensed by a vehicle speed sensor, a steering angle signal sensed by a steering angle sensor, a signal out of brake operation detecting means for detecting brake operation and the like; and
    an automatic transmission for performing speed change control using as a hydraulic-pressure supply source a main pump driven by said engine, characterized by
        arranging a bypass hydraulic passage for ensuring communication between said main pump and a point immediately before an engagement-pressure supply port of a forward engagement element in the automatic transmission, and
        switching-valve control means for switching said switching valve to the communication state during a predetermined time period when said idle-stop control means output a release command for releasing an idle stop of the engine after said idle stop.

3. The control system for an automatic transmission as described in claim 1, characterized in that said switching-valve control means include means for driving said starter motor by an output of a release command for releasing an idle stop of the engine when the engagement pressure of said forward engagement element is greater than a predetermined value, or after the idle stop by said idle-stop control means, and for switching said switching valve to the non-communication state when outputting a signal for stopping driving of said starter motor after completion of engine start.

4. The control system for an automatic transmission as described in claim 1, characterized in that it comprises an orifice on a hydraulic passage for supplying a hydraulic pressure to each engagement element formed in the automatic transmission and said switching valve, wherein a diameter of the orifice of said switching valve is set to be more than twice as large as that of the orifice on the hydraulic passage of said each engagement element.

5. The control system for an automatic transmission as described in claim 1, characterized in that said idle-stop control means include means for prohibiting an idle stop when a select position selected by a driver is an R range or in a reverse state, and when a detected oil temperature fails to be within a predetermined range.

6. The control system for an automatic transmission as described in claim 1, characterized in that said forward engagement element is provided with engagement-pressure detecting means for detecting an engagement pressure and engagement-pressure comparing/determining means for comparing the detected engagement pressure and a predetermined engagement pressure set in advance for allowing securing of an engagement pressure,
    wherein said switching-valve control means include means for switching the switching valve to the non-communication state when said engagement-pressure comparing/determining means determine that the detected engagement pressure is greater than said predetermined engagement pressure.

7. The control system for an automatic transmission as described in claim 1, characterized in that said switching valve includes a solenoid valve comprising a return spring and an electromagnetic solenoid for generating an electromagnetic force opposite to the return spring, and said engagement-pressure detecting means and said engagement-pressure comparing/determining means include a feedback-pressure circuit for supplying from the hydraulic pressure of the forward engagement element a hydraulic-pressure force opposite to an electromagnetic force of said electromagnetic solenoid.

8. A control system for an automatic transmission in a vehicle comprising:
    an engine including a starter motor for start and idle-stop control means for outputting signals for idle operation and stop for the engine to an engine control unit in accordance with preset idle stop conditions and on the basis of a vehicle speed signal sensed by a vehicle speed sensor, a steering angle signal sensed by a steering angle sensor, a signal out of brake operation detecting means for detecting brake operation and the like;

an automatic transmission for performing speed change control using as a hydraulic-pressure supply source a main pump driven by said engine;

a solenoid valve for directly supplying from said main pump an engagement pressure of a forward engagement element of said automatic transmission; and a solenoid-valve control means for current-value controlling operation of the solenoid valve, characterized in that said solenoid-valve control means include means for outputting a command for at least more than a predetermined pressure required for complete engagement of said forward engagement element with regard to a current value of said solenoid valve when said idle-stop control means output a release command for releasing an idle stop of the engine after the idle stop.

9. The control system for an automatic transmission as described in claim 8, characterized in that said solenoid-valve control means include means for continuing said command for more than the predetermined pressure until a vehicle speed after vehicle restart becomes a predetermined value after a given time subsequent to restart of the starter motor or after the idle stop.

10. The control system for an automatic transmission as described in claim 2, characterized in that said switching-valve control means include means for driving said starter motor by an output of a release command for releasing an idle stop of the engine when the engagement pressure of said forward engagement element is greater than a predetermined value, or after the idle stop by said idle-stop control means, and for switching said switching valve to the non-communication state when outputting a signal for stopping driving of said starter motor after completion of engine start.

11. The control system for an automatic transmission as described in claim 2, characterized in that it comprises an orifice on a hydraulic passage for supplying a hydraulic pressure to each engagement element formed in the automatic transmission and said switching valve, wherein a diameter of the orifice of said switching valve is set to be more than twice as large as that of the orifice on the hydraulic passage of said each engagement element.

12. The control system for an automatic transmission as described in claim 2, characterized in that said idle-stop control means include means for prohibiting an idle stop when a select position selected by a driver is an R range or in a reverse state, and when a detected oil temperature fails to be within a predetermined range.

13. The control system for an automatic transmission as described in claim 2, characterized in that said forward engagement element is provided with engagement-pressure detecting means for detecting an engagement pressure and engagement-pressure comparing/determining means for comparing the detected engagement pressure and a predetermined engagement pressure set in advance for allowing securing of an engagement pressure, wherein said switching-valve control means include means for switching the switching valve to the non-communication state when said engagement-pressure comparing/determining means determine that the detected engagement pressure is greater than said predetermined engagement pressure.

14. The control system for an automatic transmission as described in claim 3, characterized in that said forward engagement element is provided with engagement-pressure detecting means for detecting an engagement pressure and engagement-pressure comparing/determining means for comparing the detected engagement pressure and a predetermined engagement pressure set in advance for allowing securing of an engagement pressure, wherein said switching-valve control means include means for switching the switching valve to the non-communication state when said engagement-pressure comparing/determining means determine that the detected engagement pressure is greater than said predetermined engagement pressure.

15. The control system for an automatic transmission as described in claim 2, characterized in that said switching valve includes a solenoid valve comprising a return spring and an electromagnetic solenoid for generating an electromagnetic force opposite to the return spring, and said engagement-pressure detecting means and said engagement-pressure comparing/determining means include a feedback-pressure circuit for supplying from the hydraulic pressure of the forward engagement element a hydraulic-pressure force opposite to an electromagnetic force of said electromagnetic solenoid.

* * * * *